United States Patent
Lajoie

Patent Number: 6,129,251
Date of Patent: Oct. 10, 2000

[54] RETAINER SYSTEM FOR A ROD

[76] Inventor: Timothy P. Lajoie, 46 State Rd., Baldwinville, Mass. 01436

[21] Appl. No.: 09/133,780

[22] Filed: Aug. 12, 1998

Related U.S. Application Data

[60] Provisional application No. 60/055,470, Aug. 12, 1997.

[51] Int. Cl.[7] .................................................. A01K 97/04
[52] U.S. Cl. ......................... 224/197; 224/251; 224/271; 224/922; 43/21.2
[58] Field of Search .................................... 224/271, 272, 224/251, 197, 200, 922; 43/21.2; 248/339

[56] References Cited

U.S. PATENT DOCUMENTS

| | | |
|---|---|---|
| 396,909 | 1/1889 | Annin . |
| 2,271,136 | 1/1942 | Geiger ..................................... 224/200 |
| 3,749,294 | 7/1973 | Johnston ................................. 224/200 |
| 3,874,573 | 4/1975 | Fruscella et al. . |
| 4,132,381 | 1/1979 | McCellan . |
| 4,569,466 | 2/1986 | Webber . |
| 4,739,914 | 4/1988 | Pothetes ................................... 224/200 |
| 5,024,018 | 6/1991 | Ferrigno ................................... 224/200 |
| 5,123,578 | 6/1992 | Morse . |
| 5,571,228 | 11/1996 | McMurtrie ................................ 43/21.2 |
| 5,620,121 | 4/1997 | Watson .................................... 224/272 |
| 5,664,712 | 9/1997 | Smrt ....................................... 224/250 |
| 5,915,942 | 6/1999 | Ratliffe ................................... 224/272 |

*Primary Examiner*—Stephen K. Cronin
*Attorney, Agent, or Firm*—Sharon L. Day

[57] ABSTRACT

A retainer system for a rod and a mounting device for storing the rod utilizing the retainer system are provided. The retainer system has a retainer portion or rest for receiving the rod and a rod engagement means for closely mounting on a rod. The rod engagement means has a hook shaped structure at one end. The retainer portion has a retainer back which includes a material engagement means and a support. The material engagement means in one embodiment is clip-like and is used to clasp material such as a belt or a waist band, thereby attaching the retainer portion to a person wishing to transport a rod or fish using a rod. The support is bowl-like and has a lip. Preferably the lip is configured so as to firmly engage the hook shaped structure of the rod engagement means when the hook shaped structure is mounted thereon. The retainer back is resilient and semi-flexible. It can be compressed and thus snapped into an aperture in a mounting device or the material engagement means can be used to engage the mounting device. The mounting device is hung from a flat surface with the retainer system used to couple, for example, fly fishing rods to the mounting device for storage purposes. When a person wants to take a rod fishing, the retainer system and attached rod are snapped out of the mounting device and attached to the fisherman at, for example, a waist band. The rod balances at the hip region of the fisherman freeing hands for transporting other equipment. When the fisherman is ready to cast, the rod engagement means at the hook shaped structure is snapped off the support at the bowl lip. When the fisherman wants to continue fishing, while having one hand free, the hook shaped structure is again snapped onto the lip of the bowl of the retainer portion. Attached in this manner, the rod can be freely maneuvered along the edge of the bowl mouth with one hand, freeing the second hand for other tasks.

13 Claims, 11 Drawing Sheets

RETAINER SYSTEM FOR A ROD

This application claims the benefit of United States Provisional Application Serial No. 60/055,470, filed Aug. 12, 1997 entitled: A Retainer System for a Rod, the disclosure of which is incorporated herein in its entirety.

FIELD OF THE INVENTION

A retainer system for a rod and a mounting device for storage of the retainer system are provided. The retainer system comprises a rest or retainer portion and a body or rod engagement means having a hook for engaging the rest. The retainer system is especially useful for holding a rod or rods when fishing and free use of both hands is desired, for example when tying flies, retrieving a lure, using an alternate rod and the like. The retainer system is also useful for transporting a rod and for storage of a rod.

BACKGROUND OF THE INVENTION

Various rod holsters and holders for securing the butt end of a fishing rod to a person while fishing or transporting a fishing rod are known in the art. Examples include U.S. Pat. Nos. 5,123,578 (Morse); 5,024,018 (Ferrigno); 4,569,466 (Webber) and 3,874,573 (Fruscella, et al.), each of which limit the mobility of the rod relative to the person fishing and each of which a require a semi-permanent attachment to a belt. These and other commercially available rod holders suffer from additional short-comings. Where the rod is not secured to the holder, a danger of losing the rod occurs if the person fishing needs both hands to accomplish an alternate task. In some instants, the holder orientation requires that the person fishing be right handed. Further, previous holders have limited mobility and orientation of the rod relative to the person fishing, especially with respect to the side to side mobility of the rod when attached to the fisherman.

OBJECTS

It is an object of the instant invention to provide a retainer system for rod, such as for example a fishing rod, which secures the rod to the person and the rod to the retainer portion while increasing the mobility of the rod relative to the fisherman. It is an additional object of the invention to provide a retainer system which secures a rod to a person transporting a rod, thus freeing both of the person's hands for an alternate task. It is an object of the instant invention to provide a retainer which in combination with a rod engagement means comfortably secures the rod to the person both when the rod is oriented for fishing and when the rod is oriented for transporting.

It is a further object of the invention to provide a retainer system which is easy to mount and dismount from an article of clothing worn by a person when fishing.

It is a still further object of the invention to provide a retainer system which is useful by both left and right handed persons.

SUMMARY OF THE INVENTION

The inventive rod retainer system has two components: a retainer portion or rest for supporting the end of a rod proximal to the butt and a rod engagement means or body for connecting to the retainer portion while balancing the rod. The retainer portion for supporting the butt end of a rod has a bowl with a lip and a semi-flexible retainer back having a plurality of apertures, such as for example a clip-like extension or hole for receiving thread, for attaching or mounting the bowl at a pocket, a belt, waders and the like, to the person. The retainer portion may also be attached to a mounting device for storage. The rod engagement means preferably attaches at a first hook-shaped end to the retainer portion at the bowl shaped region and at its second end to a fishing rod at the balancing point of the rod. When the person is fishing, the rod engagement means is disengaged from the bowl, for example when casting. When the fisherman requires the use of one or both hands even though the fishing line and hook may still be in the water, the rod engagement means is snapped back onto the bowl. Since the retainer system is designed to balance the rod, the fisherman can continue fishing with the rod at his hip with the rod positioned at substantially a right angle to the fisherman's torso.

In the preferred embodiment of the retainer portion, the retainer back is made with a semi-flexible material that can bend. The retainer back has a means for engaging material such as for example, an extended arm(s) that is clip-like or notch-like for grasping a material. The retainer portion has a bowl shaped protrusion attached to the retainer back. The bowl shaped protrusion, also called a bowl, has a mouth, a protruding lip on its exterior surface, a contoured interior surface, and a bottom. The lip has a slanted upper edge, a middle portion, and a slanted lower edge which provides the lip with a substantially trapezoidal shape. However, alternative shapes for the lip are contemplated.

The rod engagement means has a first end and a second end. The first end which is substantially hook shaped mirrors the shape of the interior surface of the bowl. The interior surface of the bowl is contoured to reflect the shape of the lip. The second end engages the rod. In a first embodiment, the rod engagement means has two components: a closure band which preferably is a cable tie; and a body having an aperture (also termed a "band receiving aperture") for receiving or engaging the rod receiving closure band and having a hook for engaging the bowl. A fishing hook receiving aperture may also be present in the body. The closure band has a locking mechanism for securing the body with the hook end to the rod, for example a band having locking ribs at one end and a hole for receiving the locking ribs at the other end.

In a second embodiment of the rod engagement means, the body has a hook for engaging the bowl at a first end of the body and a substantially circular snap on hook for engaging the rod at a second end of the body. Thus, the rod engagement means has a unitary construction. The rod engagement means hook at the first end of the body has a shape which is the mirror image of the bowl at the interior surface of the lip. The shape of the interior surface of the bowl and the shape of the hook at the first end of the rod engagement means complement each other. In a third embodiment of the rod engagement means, the second end has two arms, each arm having a serrated or toothed surface. The interior face of the first arm mates with the exterior face of the second arm when pressure is applied to the mated arms. The rod engagement means is made of a resilient material which allows the rod engagement means to be snapped on to and off of the retainer portion.

A mounting device for receiving the retainer system for storage of the retainer system or the retainer system and rod is also provided.

BRIEF DESCRIPTION OF THE DRAWINGS

FIG. 2BA illustrates a side perspective view of the retainer portion of FIG. 2A.

FIG. 2BB illustrates a cross-sectional view of the retainer portion of FIG. BA.

DESCRIPTION OF THE PREFERRED EMBODIMENT

Figure 1A:
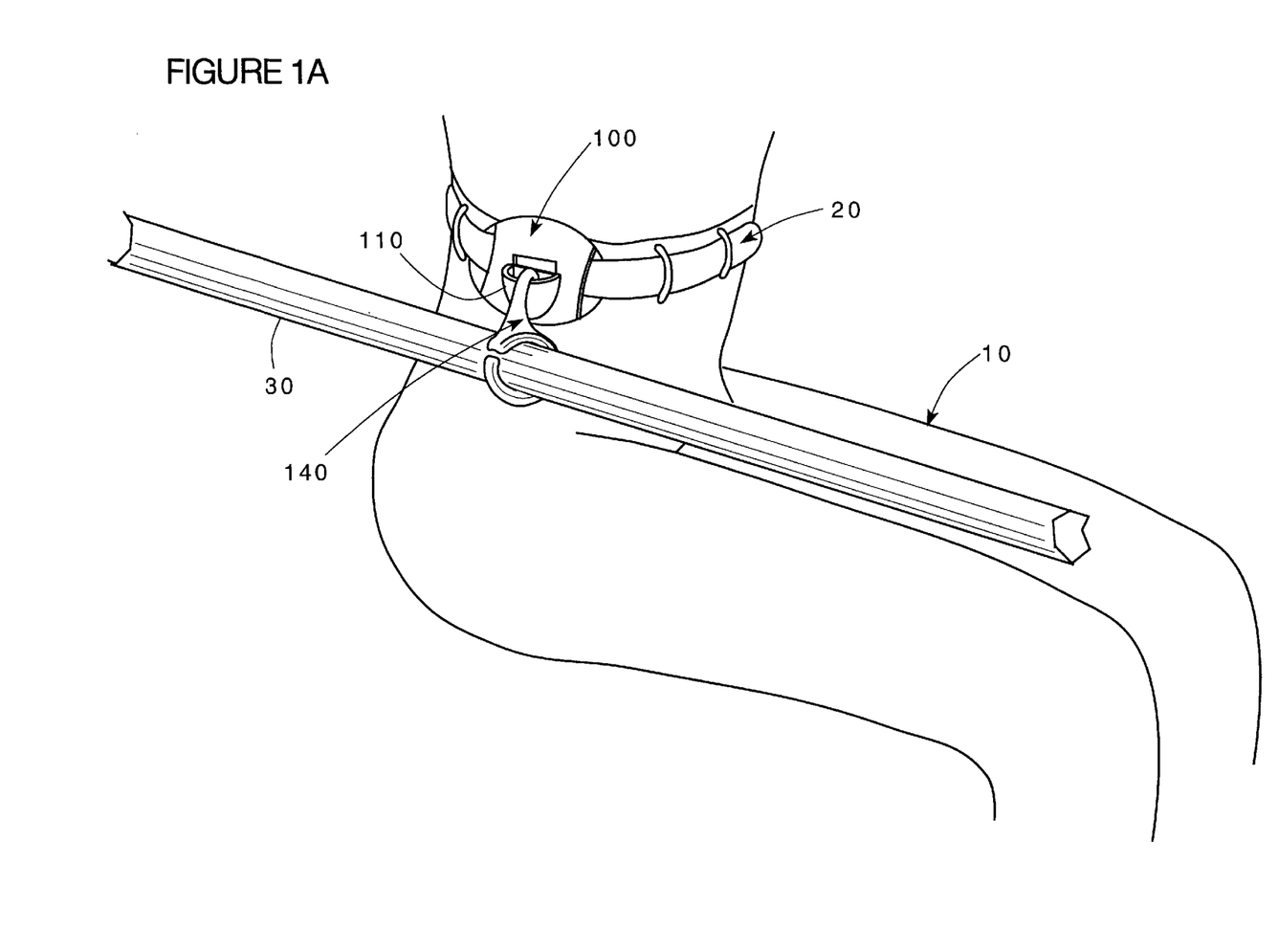
FIG. 1A illustrates an isometric view of the instant invention in use supporting a fishing rod.
Figure 1B:
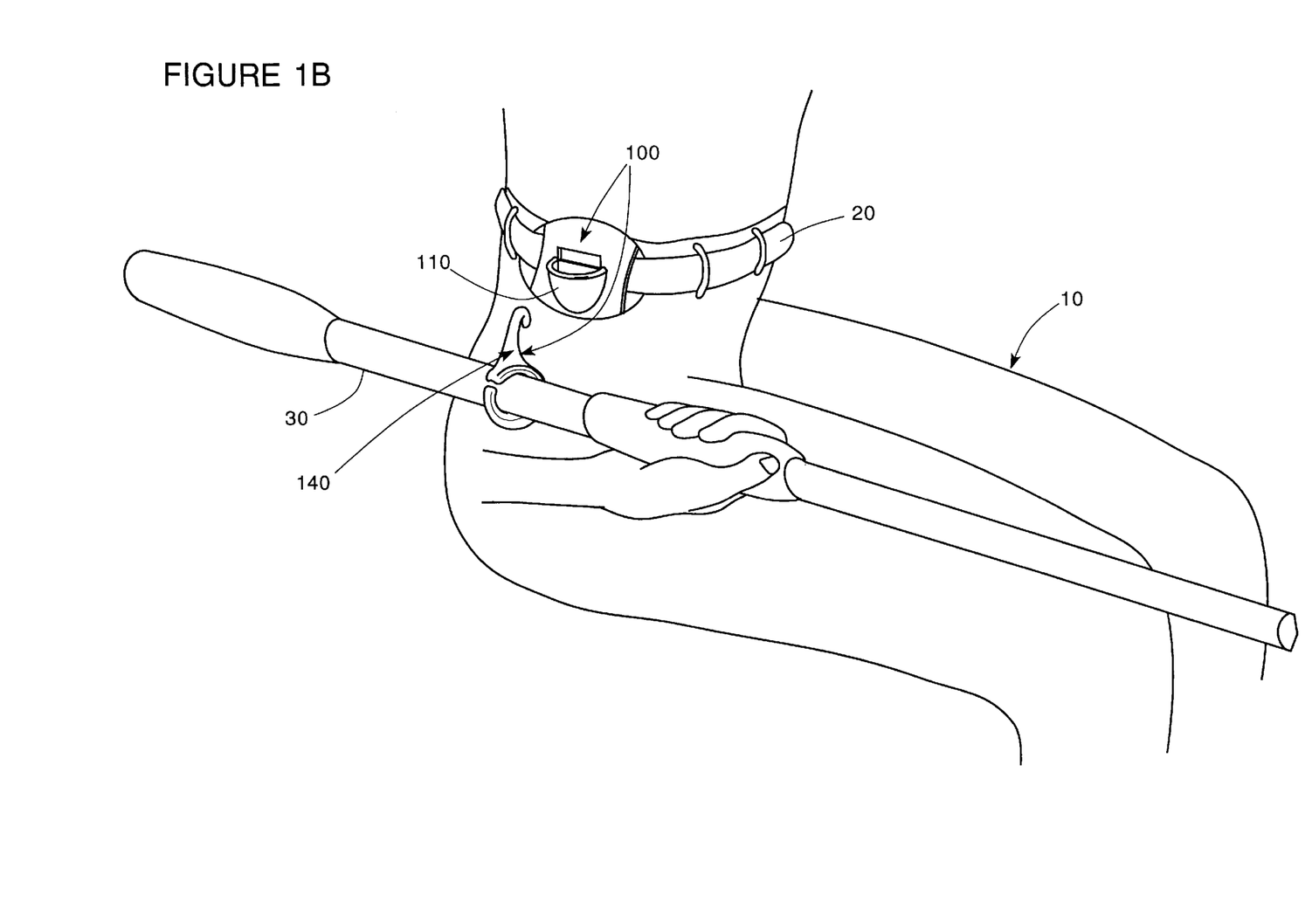
FIG. 1B illustrates an isometric view of the invention of FIG. 1A when the rod engagement means is removed from the retainer portion.

When fishing with a rod, especially when fly fishing, the ability to manipulate a rod with one hand while maintaining control of the rod is highly desired. The inventive retainer system firmly anchors the butt end of the rod in a support or retainer portion while securing the rod to the support by a snap on rod engagement means which can be comfortably positioned on the person, thus freeing a hand for other functions, such as for example, retrieving a dropped object. Referring now to FIG. 1, a person 10 wearing waders and a belt 20 is shown wearing a retainer system, generally referenced throughout as reference numeral 100, while the rod is in position to be transported. The retainer portion (also called a rest or support) of the retainer system is mounted on the belt while balancing a rod 30 using the retainer system. The retainer portion 110 of the retainer system provides a rest or support for the rod, while the rod engagement means (also called a body) 140 secures the rod to the retainer portion 110. Hands are not required to secure and balance the rod. When the person wants to use the rod to fish, as is illustrated in FIG. 1B, the rod engagement means 140 mounted on the rod is unsnapped at its hook shaped first end from the retainer portion 110 while the fisherman casts. The rod engagement means 140 may then be snapped back on to the retainer portion and manipulated with only one hand while fishing.

Figure 2:
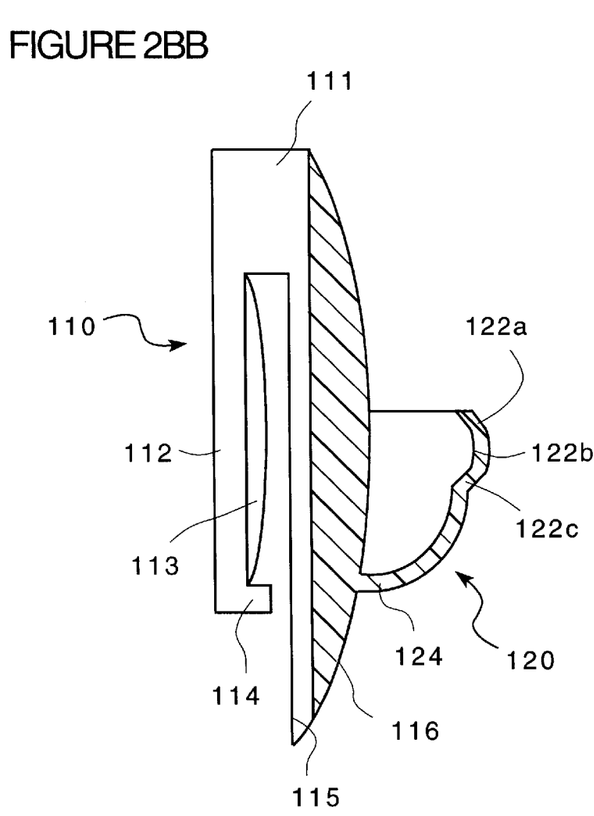
Figure 2A:
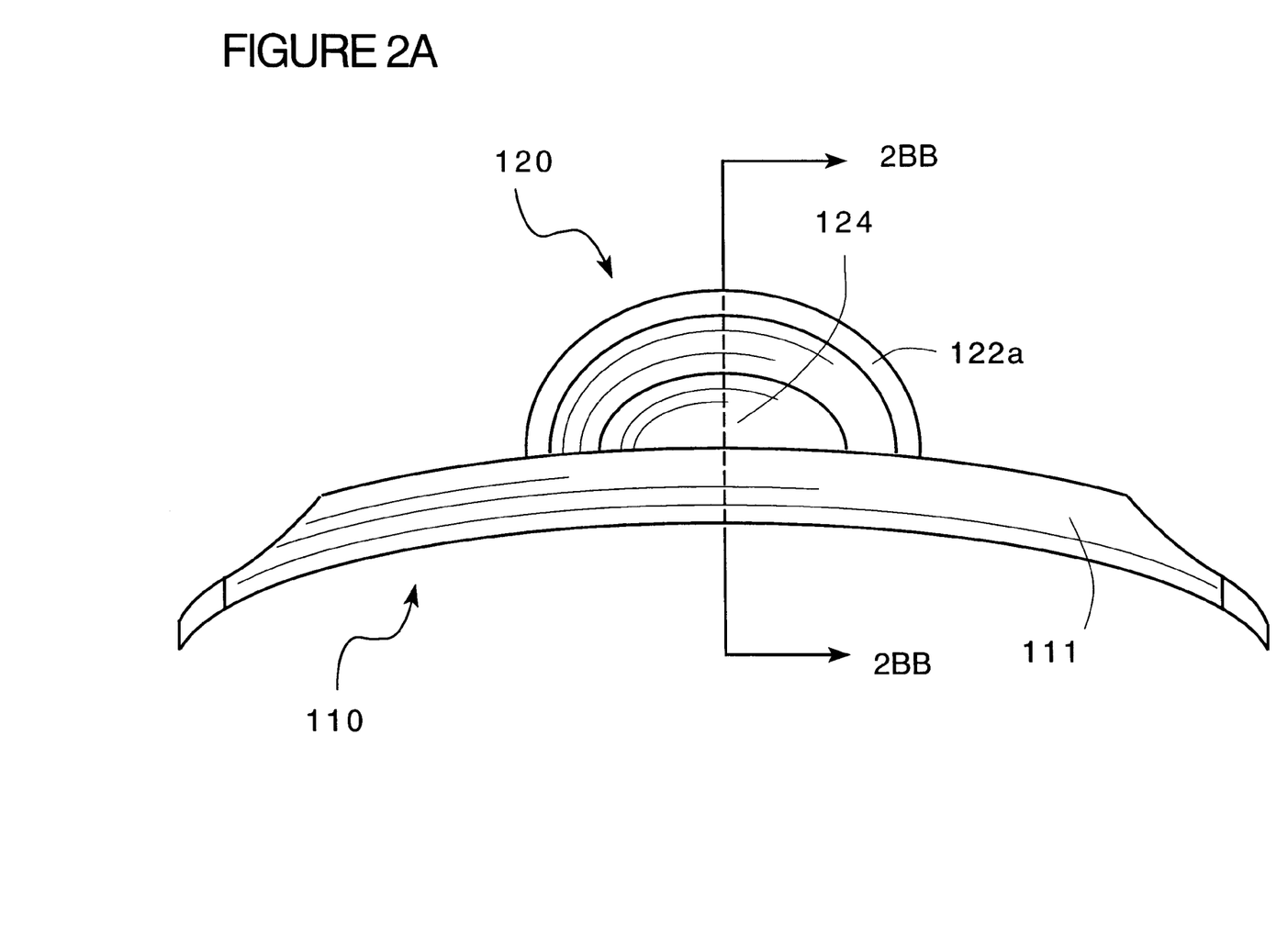
FIG. 2A illustrates a top down perspective view of a retainer portion of the instant invention having a bowl with a lip and a retainer back.
Figure 2C:
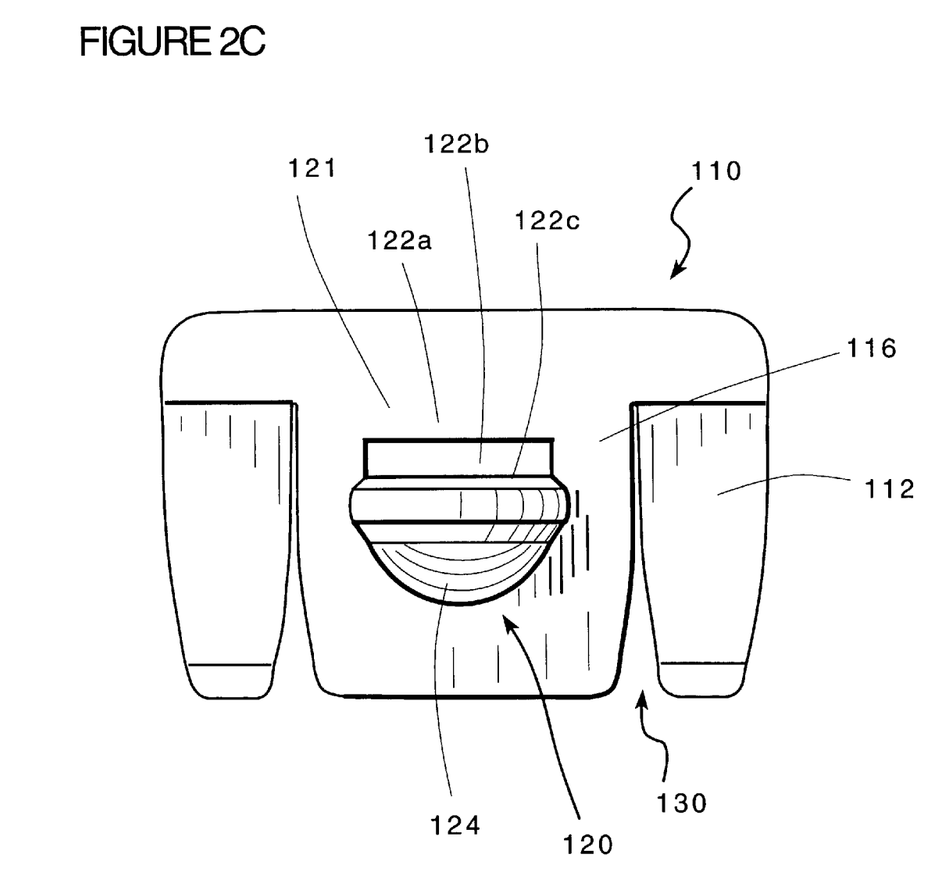
FIG. 2C illustrates an isometric frontal view of the retainer portion of FIG. 2A.

Referring now to the series of FIGS. 2A, 2B, and 2C which illustrate the preferred embodiment of the retainer portion, comprises a retainer back, a structure for receiving a rod engagement means which is illustrated herein as a bowl shaped structure, and a material engagement means. FIG. 2A shows a top down view of the retainer portion 110 looking in through the open mouth of the bowl (generally referenced throughout by the reference numeral 120) towards the bowl base 124. The upper edge 122a of the lip of the bowl is shown. Preferably, the bowl is contoured at its interior surface to reflect the protruding lip shape illustrated in FIG. 2B. The bowl 120 is attached to a retainer back, generally referenced throughout by the reference numeral 111. Preferably, the retainer back is made of a semi-flexible polymeric material so that it may be conformed to the shape of the fisherman.

FIG. 2BA illustrates a side perspective view of the retainer portion of FIG. 2A. FIG. 2BB, the reference numerals of which correspond to those shown in FIG. 2BA, provides a cross-sectional view of the retainer portion 110 of FIG. 2BA of the retainer portion 110 which illustrates one embodiment of a material engagement means, which in this figure is shown as a clip-like or notched structure having an elongated arm 112 which extends from the top edge of the retainer back 111 and which terminates in a tip which has a protrusion 114. The material engagement means is used for mounting the retainer portion on a person. Alternatively, it can be used for mounting the retainer system on a wall unit during storage thereof. The inner face of the arm has a rounded protrusion 113 which in conjunction with the tip 114 acts to facilitate gripping of material against the rear face 115 of the retainer back upon which the bowl 120 is mounted. The exterior face 116 of the retainer back is slightly rounded to indicate that the retainer back is semi-flexible. The bowl exterior face has a lip having a upper edge panel 122a at the top which slants from the bowl mouth towards a first edge of an elongated, protruding middle portion 122b of the lip. A slanted lower edge panel 122c connects a second edge of the middle portion with the bowl exterior face. The interior face of the bowl is contoured to reflect this shaping and provides an indented surface along which a rod engagement means can slide. The rod engagement means which has a shape which is the mirror image of the bowl exterior face at the lip. The rod engagement means may be releaseably attached to the bowl at the lip so that when snapped onto the bowl, the rod engagement means may slide along the edge of the lip. Thus, when a rod is mounted on the bowl with the rod engagement means snapped to the bowl, the rod can swing from side to side without becoming detached from the bowl. The base of the bowl 124 is also shown.

FIG. 2C provides a view of the retainer portion 110 which shows the front face 116 of the retainer back, the bowl 120, and an embodiment of the material engagement means, generally referenced as reference numeral 130. A material, such as for example, fabric, a wall mounted bracket, a belt, or the like, is urged into the material engagement means when it is mounted. FIG. 2C also provides a front view of the bowl. The base 124 of the bowl is gradually rounded. An aperture 121 in the retainer back is visible at the mouth of the bowl which is the slanted upper edge of the lip 122a. The middle portion of the lip 122b and the slanted lower edge 122c of the lip are also shown. Thus, the lip is substantially trapezoidal in shape. The retainer back is made of a semi-flexible, resilient preferably plastic material, for example ABS, polyethylene blends of medium to high density, impact rubberized styrene, a polypropylene homopolymer or copolymer resin or a nylon, such as for example nylon 6. Nylon 6 is preferred.

Figure 3:
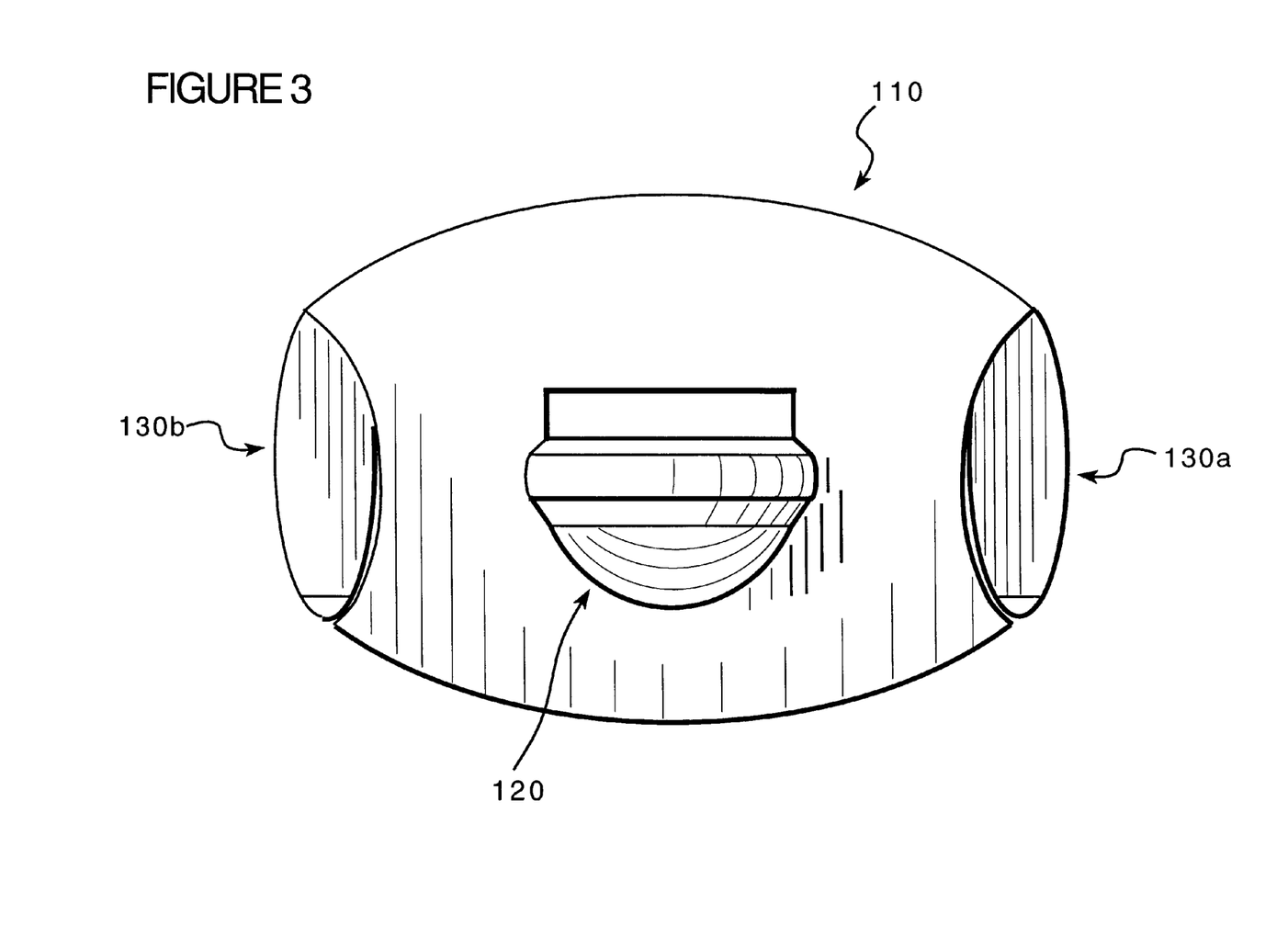
FIG. 3 illustrates a front isometric view of an alternative embodiment of the retainer portion for supporting a rod.

Referring now to FIG. 3, an alternate embodiment of the retainer portion 110 is illustrated. A bowl 120 for receiving a rod engagement means is shown. Clip-like or notched structures 130a, 130b having apertures in the retainer back 311 for receiving material, such as for example leather, are illustrated. This embodiment is particularly suited for mounting on a belt as is illustrated in FIG. 1.

Figure 4A:
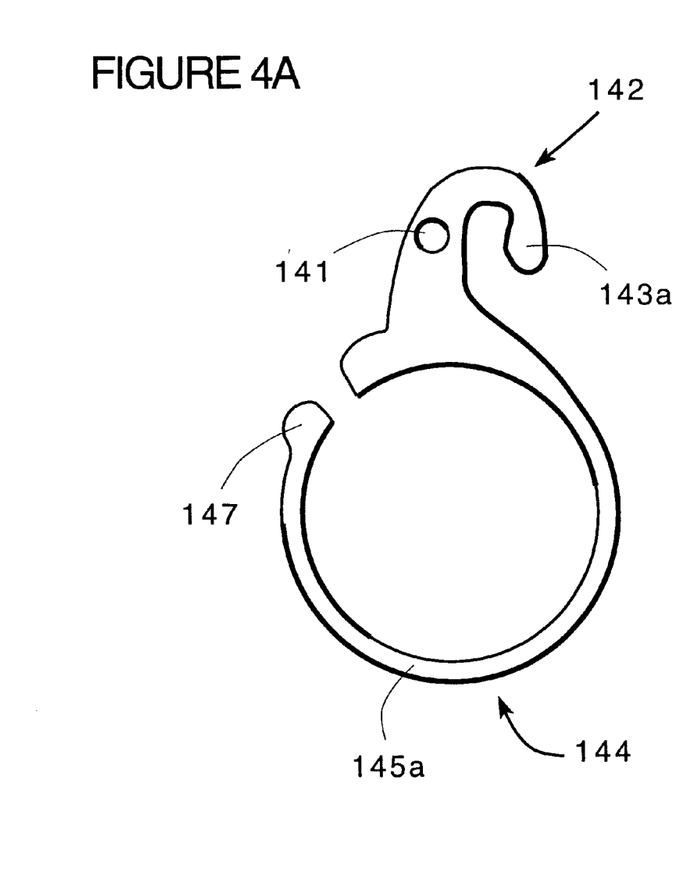
FIG. 4A illustrates an isometric side view of a first embodiment of a rod engagement means for connecting the retainer portion and the rod when the rod is of the type that balances on the rod handle.
Figure 4B:
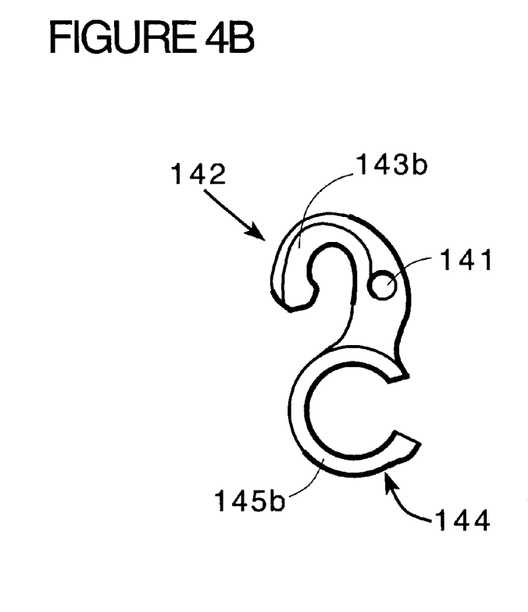
FIG. 4B illustrates an isometric side view of a variation on the embodiment of FIG. 4A of a rod engagement means for connecting the retainer portion and the rod when the rod is of the type that balances on the rod in front of the rod handle.

Referring now to FIGS. 4A and 4B which illustrate the preferred embodiment of the rod engagement means, generally referenced throughout the specification by reference numeral 140. The rod engagement means, also called a body, has a first end 142 for engaging the lip of the bowl of the retainer portion and a second end for engaging a rod. The first end 142 has a shape which is substantially a mirror image of the shape of the bowl at its top lip. The second end, generally referenced as reference numeral 144, provides a means for attaching to a rod. The first end of the body closely fits the shape of the retainer bowl lip thus it acts to secure the rod against displacement by an upward motion. Removal of the rod from the retainer portion is accomplished by performing an outward and upward motion at the rod engagement means. The body is made of thermoplastic elastomer (TTE), such as for example Hytrel™ TTE (available from E. I. DuPont de Nemours & Co., Inc., Wilmington, Del.) which has a memory or resiliency which urges the body, also called the rod engagement means, back into its original configuration after it is stretched at its ends to receive or release a rod or a retainer portion. Variations on the second end are provided to illustrate different embodiments of the rod engagement means. Preferably, a hole 141 for securing a fishing hook or like when transporting the rod is located proximal to the first end. The size of the second end, 145a as shown in FIG. 4A and 145b as shown in FIG. 4B, of the rod engagement means varies depending upon the rod chosen.

Primarily two types of rods exist: those which balance on the handle and those which balance in front of the handle. FIG. 4A illustrates an embodiment of a rod engagement means having a first end 143a for engaging a bowl of a retainer portion and a curved second end 145a for engaging a rod for use with a rod which balances on the rod handle. FIG. 4B illustrates an embodiment of a rod engagement means having a first end 143b for engaging a retainer portion and a second curved end 145b for engaging a rod for use with a rod which balances in front of the handle. The second end of each rod engagement means embodiment shown in FIGS. 4a and 4b, curves in a direction opposite to that of the curvature of the first end to facilitate balancing of the rod at the retainer portion when the rod is secured by the second end of the rod engagement means and the first end is clipped to the bowl. FIG. 4a also illustrates a protrusion 147 located at the second end which is useful for urging the second end of the rod engagement means away from the rod when disengaging the rod from the rod engagement means of the retainer system.

Figure 5A:
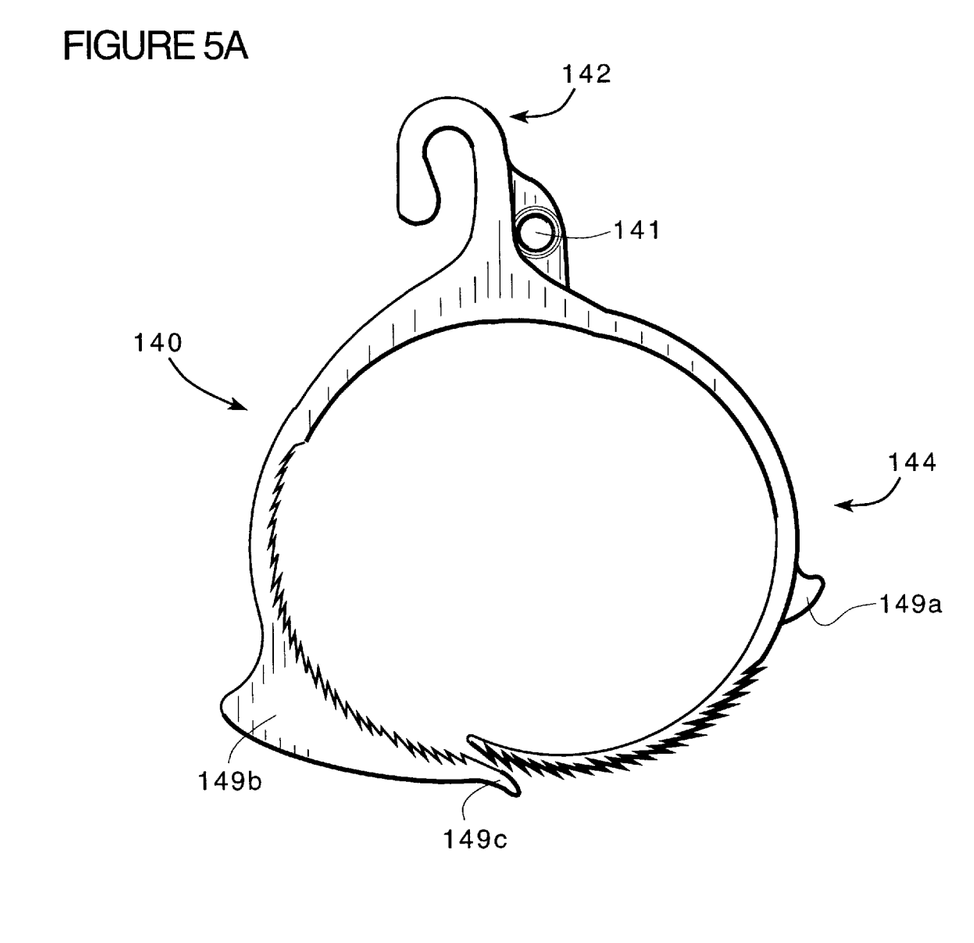
FIG. 5A illustrates an isometric side view of a second embodiment of a rod engagement means having a hook at one end for engaging the retainer portion at the lip of bowl and having a locking means at the opposite end for securing the butt end of a fishing rod to the hook end where the locking means is in the open position.
Figure 5B:
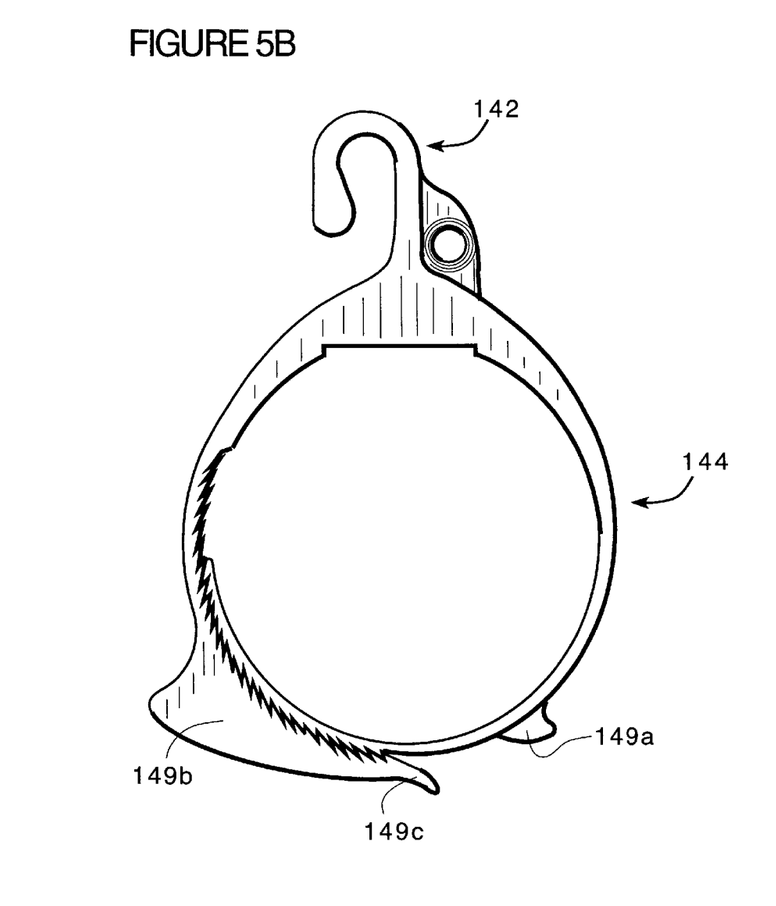
FIG. 5B illustrates an isometric side view of the second embodiment of the rod engagement means of FIG. 5A where the locking means is in the closed position.
Figure 5C:
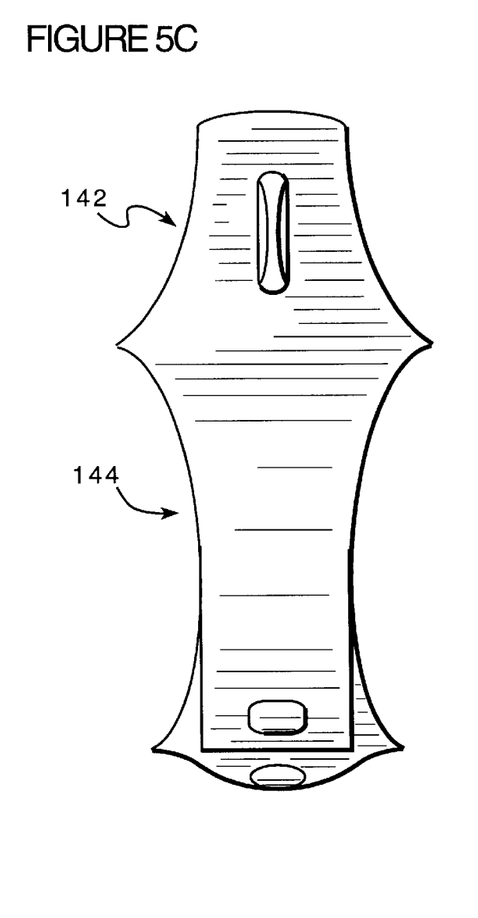
FIG. 5C illustrates a top down view of the embodiment of FIG. 5B.

Referring now to FIGS. 5A, 5B, and 5C which illustrate an alternative embodiment of the rod engagement means wherein the second end of the body has a racketed closure means. The closure means has a first arm having a interior face and a second arm having an exterior face, each face having a serrated or toothed surface. In FIG. 5A is a side view of an alternative embodiment of the engagement means in the open position where the second end 144 of the body 140 has a serrated or toothed surfaces which can be mated. A pair of protrusions, one on each arm 149a, 149b for urging one arm towards the other arm when the closure means is to be tightened around a rod and locked in place is also present. At the tip of the first arm is a release means 149c which is used to disengage the serrated surfaces when removing the engagement means from the rod. At the first end 142 of the body is a hook shaped region having a enclosed aperture 141. A fishing hook may be secured in the aperture.

FIG. 5B which is a side view of the alternative embodiment of the engagement means of FIG. 5A shown in the closed position. FIG. 5B illustrates the mating of the two serrated surfaces. The reference numerals correspond to those provided in FIG. 5A above.

FIG. 5C illustrates a top down view of the alternative embodiment of FIG. 5A showing the first end 142 and the second end 144.

Figure 6:
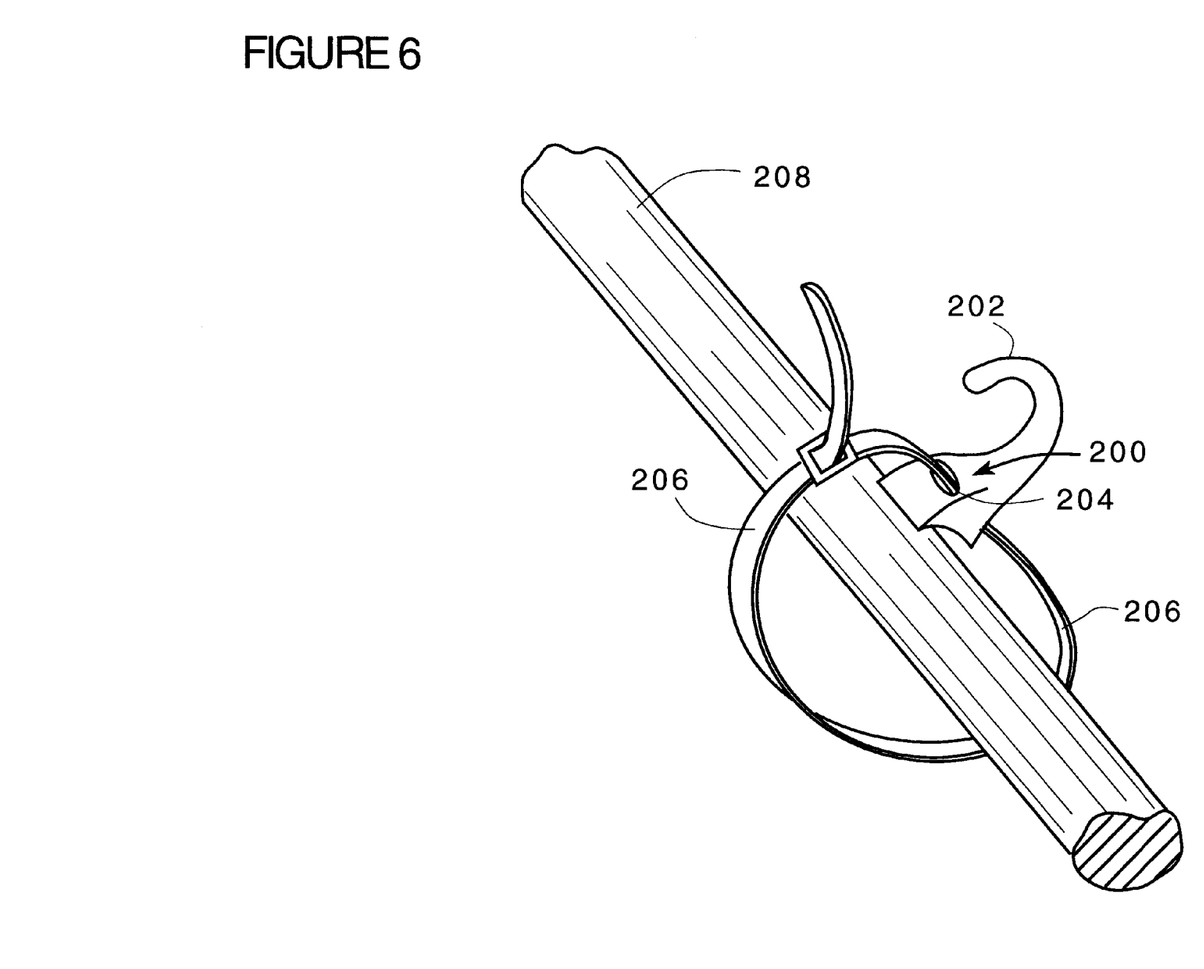
FIG. 6 illustrates an isometric view of a third embodiment of a rod engagement means having a body which has a hook for engaging the retainer portion at the bowl and a band receiving aperture and a band seated in the band receiving aperture.

FIG. 6 illustrates a third embodiment of the engagement means. A body 200 is provided with a hooked upper end 202 similar to that shown in FIG. 5B, and an aperture 204. A locking ribbed cable tie 206, similar to those used on plastic bags passes through the aperture and around the rod where it is pulled tight to lock it in position around the rod 208. This rod engagement means 206 can be removed from the rod later if desired by cutting it off. When the rod handler wishes to free their hands for other tasks, the hook 202 is placed over the lip of a molded bowl such as, for example, shown in FIGS. 2A, 2B where it catches over the lip and rests against the wall of the bowl. The bowl extends outward from the retainer back which has two slits which can be slipped over a belt or other flat object such as a storage plate on a wall. Alternately, the retainer back may be provided with perforations to allow it to be sewn onto a garment or attached by fasteners to a wall. Or the retainer back may be provided with an indentation having a shape. A flat matching shape having a size slightly less than that of the indentation having a corresponding shape is also provided in this variation. When the backing is brought proximal to a fabric and the flat indentation matching shape is placed on the other side of the fabric, application of pressure simultaneously to the two pieces sandwiches the fabric into the indentation where it is held by compression.

Figure 7:
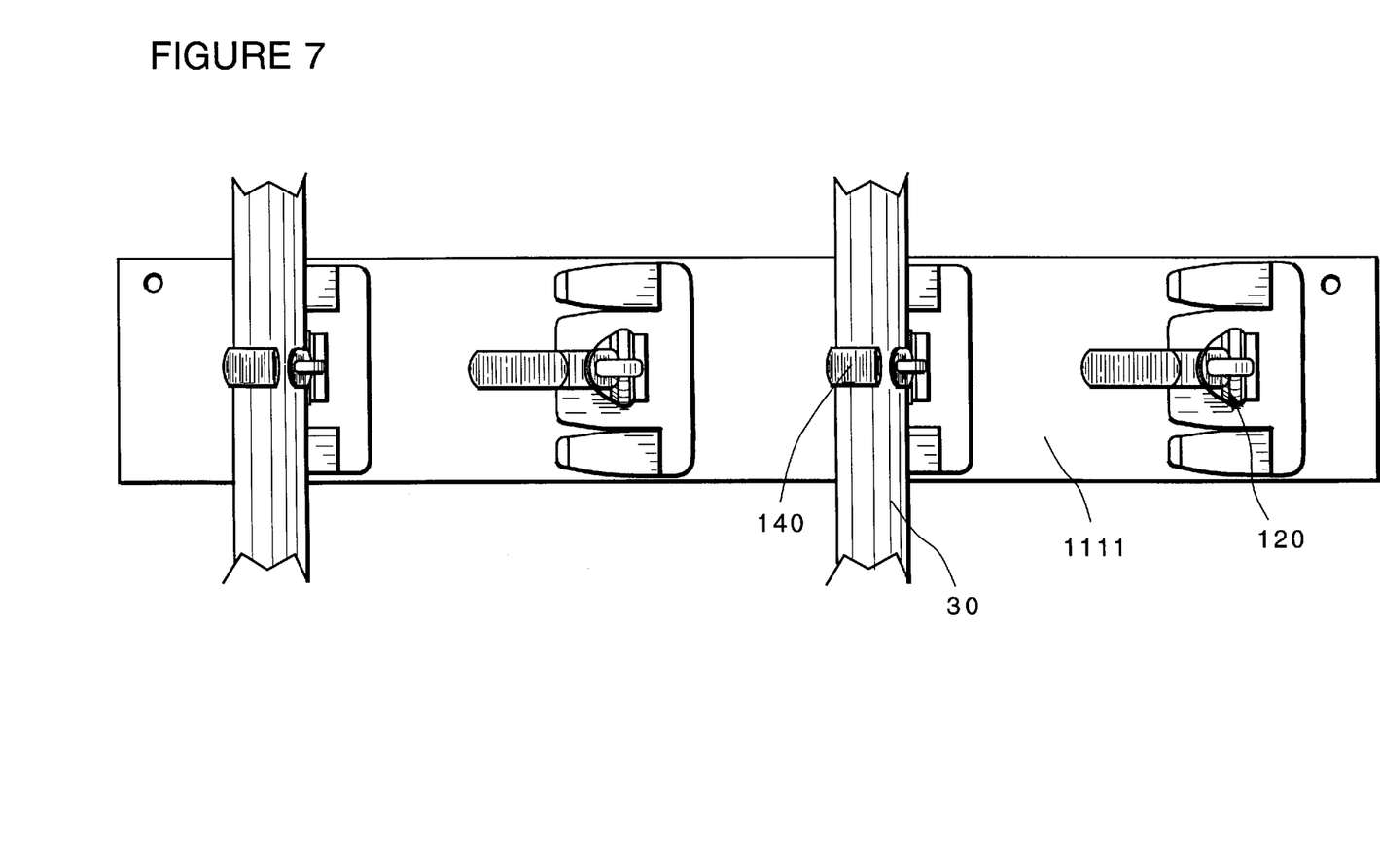
FIG. 7 illustrates an isometric view of a mounting device for storing the retainer system with or without a rod attached.

The components of the instant invention, for example the retainer system shown in FIGS. 2A through 2C, may also be utilized for storing the rods when attached to a mounting device. The retainer portion which has a retainer back, a material engagement means and a retainer bowl 120 or a plurality of retainer portions each having a retainer bowl are seated on a mounting device 1111 such as illustrated in FIG. 7. A mounting device having a flat face is provided with a means for mounting it onto a flat surface such as holes for receiving screws, mated hooked and napped surfaces, and the like. The flat backing is also provided with apertures for receiving a retainer portion. The aperture may be sized to receive the resilient retainer portion. Herein the retainer portion is compressed and fitted to the aperture, substantially snapping into the aperture. Alternatively, the retainer portion at the material engagement means may engage the mounting device at an edge of a mounting device aperture for receiving the retainer portion. The retainer portion is snapped onto the edge, clasping the edge. As described above, a rod engagement means 140 is attached to a rod 30 and the hooked end of the rod engagement means is clipped to the bowl of the retainer portion when a rod is to be stored.

Both the retainer portion and the rod engagement means can be manufactured using injection molding.

The foregoing is considered only illustrative of the currently preferred embodiments of the invention presented herein. Since numerous modifications and changes will occur to those skilled in the art, it is not desired to limit the invention to the exact construction used to illustrate the various means comprising this invention.

What is claimed is:

1. A retainer system for a rod having a balancing point comprising:

a retainer portion comprising a retainer back, a bowl, and a lip; the bowl having a mouth, a contoured interior surface, and an exterior surface, the lip extending from the exterior surface proximal to the mouth; the bowl protruding from the retainer back; and a rod engagement means having a first end and a second end, the first end comprising a hook region for engaging the lip, the second end for connecting to said rod proximal to said balancing point.

2. The retainer system of claim 1 wherein the lip is a substantially trapezoidal protrusion from an exterior surface of the bowl.

3. The retainer system of claim 1 wherein the retainer back comprises a semi-flexible material selected from the group consisting of ABS, a polyethylene blend of medium to high density, an impact rubberized styrene, and a polypropylene.

4. The retainer system of claim 1 wherein the hook region has a means for securing a fishing hook proximal thereto.

5. The retainer system of claim 4 further comprising a locking ribbed cable tie and wherein the second end of the rod engagement means has an aperture for receiving the locking ribbed cable tie.

6. The retainer system of claim 1 wherein the first end of the rod engagement means is sized to engage the contoured interior surface and the exterior surface of the bowl and the second end of the rod engagement means comprises a resilient substantially circular structure having a first arm and a second arm for receiving said rod.

7. The retainer system of claim 6 wherein the first arm has a toothed interior face and the second arm has a toothed exterior face and wherein the toothed interior face of the first arm and the toothed exterior face of the second arm mate when pressure is applied.

8. The retainer system of claim 7 further comprising a means for urging the first arm apart from the second arm.

9. The retainer system of claim 1 wherein the lip comprises an upper edge panel slanted to connect to a middle portion at a first middle portion edge and a lower edge panel slanted to connect to the middle portion at a second middle portion edge and wherein the contoured interior surface mirrors the lip.

10. The retainer system of claim 9 wherein the retainer portion further comprises a material engagement means at the retainer back, the material engagement means selected from the group consisting of a structure for engaging an article of clothing and a structure for engaging a storage system.

11. The retainer system of claim 9 wherein a wall extends upwardly from the upper edge panel of the lip to the mouth.

12. A system for storing a rod having a balancing point, said system comprising:

a retainer system comprising a resilient retainer portion, a bowl having a mouth and an interior surface, a contoured lip proximal to the mouth, the bowl protruding from the resilient retainer portion;

a rod engagement means comprising a hook end connected to a rod holder end, the hook end for slidingly coupling to the lip and the interior surface of the bowl, the rod holder end for receiving said rod proximal to said balancing point; and a mounting board having at least one pair of mounting apertures for receiving means for attaching the mounting board to a flat surface and having at least one board aperture bounded by at least two walls, the aperture sized to closely receive the resilient retainer portion.

13. The system of claim 12 wherein the resilient retainer portion has a clip-like structure for engaging one of the at least two walls.

* * * * *